United States Patent [19]
Olsson

[11] 3,971,123
[45] July 27, 1976

[54] PROCESS OF SOLIDIFYING MOLTEN METAL

[75] Inventor: Erik Allan Olsson, Zurich, Switzerland

[73] Assignee: Olsson International Inc., Pittsburgh, Pa.

[22] Filed: Dec. 30, 1974

[21] Appl. No.: 537,561

Related U.S. Application Data
[63] Continuation of Ser. No. 337,931, March 5, 1973, abandoned.

[52] U.S. Cl. ............................... 29/527.7; 164/76; 164/86; 164/276
[51] Int. Cl.² .................................... B22D 11/06
[58] Field of Search ............... 164/76, 86, 87, 276, 164/82, 277; 425/224, 327; 65/45, 145; 29/527.7

[56] References Cited
UNITED STATES PATENTS
3,089,208  5/1963  Scribner .............................. 164/87
3,542,116  11/1970  Machlin ............................. 164/86

Primary Examiner—Ronald J. Shore
Assistant Examiner—Gus T. Hampilos
Attorney, Agent, or Firm—Parmelee, Miller, Welsh & Kratz

[57] ABSTRACT

To take advantage of the fact that molten metal which first solidifies against a mold surface has better grain structure and closer chemical identity to the molten metal than the inner portions of a casting, a skin or thin layer of metal forming on a cold surface, such as a revolving water-cooled roll partly immersed in molten metal, is continuously stripped from said surface and almost immediately welded or fused under pressure to the surface of similarly-formed layers to make a unitary finished or semi-finished product. The layers so welded together may be separately formed, or comprise parts of a single layer folded or bent into surface-to-surface contact.

8 Claims, 7 Drawing Figures

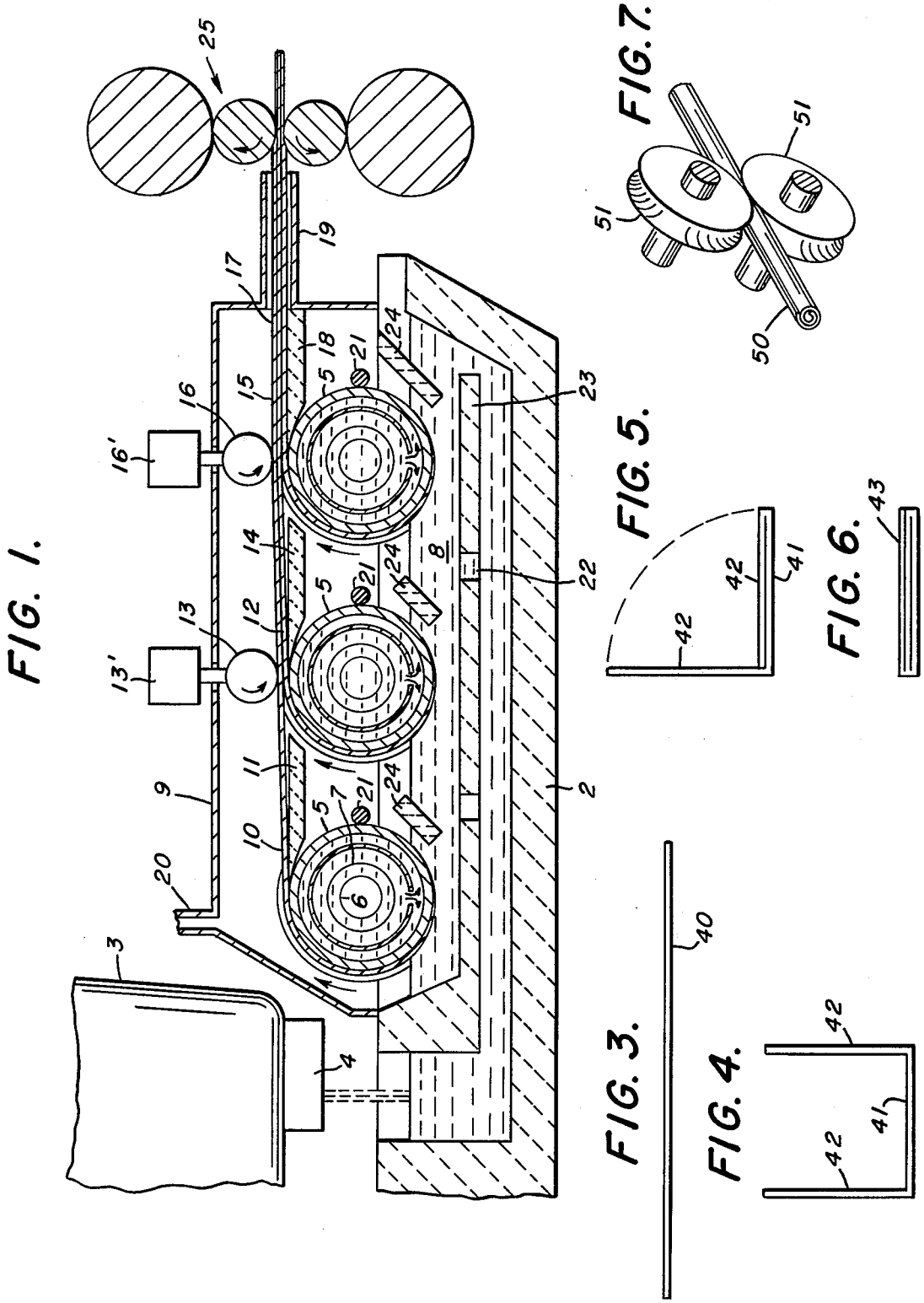

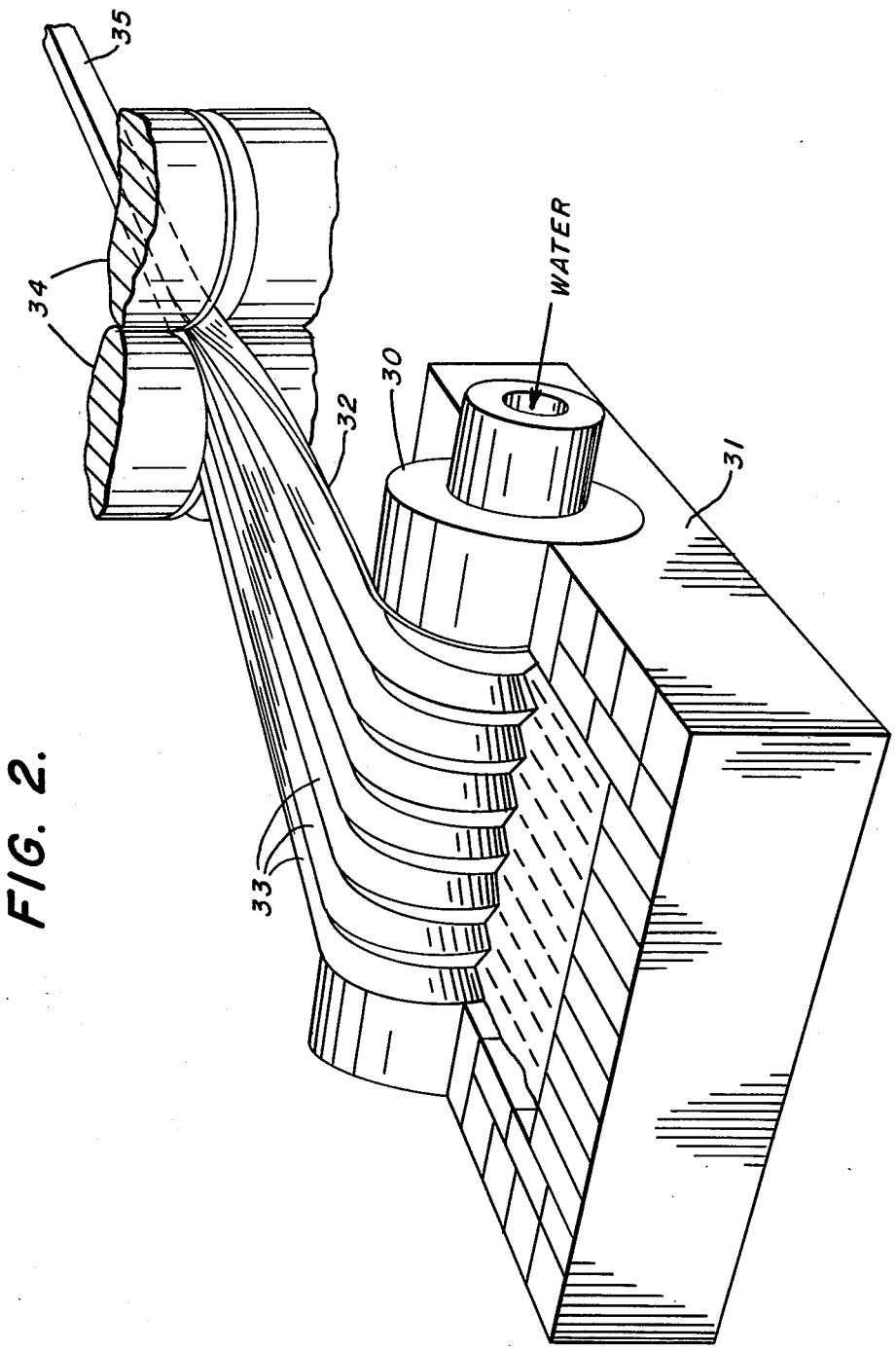

PROCESS OF SOLIDIFYING MOLTEN METAL

This is a continuation of application Ser. No. 337,931, filed Mar. 5, 1973, now abandoned.

This invention relates to the manufacture of metal products with especial, although not exclusive, reference to products comprised of ferrous metal and ferrous alloys, and more particularly to the transformation of the metal from the molten state into a semi-finished or finished product.

When liquid metal is poured into a mold, solidification progresses from the solidified layer that forms almost immediately where the metal contacts the mold inwardly toward the center. The rate at which solidification progresses depends on three factors, as follows:

1. the heat transfer coefficient through the mold walls.
2. the excess of heat in the melt above the melting heat that must be extracted to reach solidus point; and
3. the transfer of heat through the already solidified metal layers in the mold to the mold walls.

For determining the solidification speed a simplified formula is frequently used in casting technology and it is adequate for the process herein discussed. It is:

$$s = K (T)^{1/2}$$

In this equation $s$ is the shell thickness in millimeters: $T$ is the elapsed time in minutes from the start of solidification. The factor $k$ for steel varies from 22 to 33 mm. per minute $^{1/2}$ and can be calculated from different data derived in practical tests. Of course the exponent $^{1/2}$ signifies square-root. The influence of superheat is not indicated in this formula, but for the purpose of this application need not be considered.

This equation tells one that the velocity of shell growth, that is solidification from the outside toward the interior, decreases rapidly from the beginning of the shell formation and the increase in shell thickness. For example, at the beginning the freezing or solidification to a thickness of 5 mm. takes only approximately 0.028 minutes if $k$ is 30, but to secure a 5 mm. increase of thickness after 4 minutes when the shell will be 60 mm. it will then take approximately 4.7 minutes.

The rate of solidification has a considerable effect on the structure and composition of the metal. The layer of metal that solidifies rapidly next to the mold wall has small, randomly-oriented crystals that constitute a chill zone. It will vary, according to the composition of the steel or other metal, between about 5 mm. to about 10 mm. or possibly 12 mm. in thickness. Killed steel forms a chill zone of approximately 10 mm. in thickness. In the chill zone the chemical composition will conform closely to the composition of the molten steel, and its mechanical properties are also superior to be metal which subsequently solidifies, or at least so with most steels. As the rate of cooling slows down inwardly from the chill zone, large crystals—dendrites—develop, resulting in a structure that is fragile at rolling temperature and can easily produce internal cracks unless only small reductions in cross section are employed in the initial rolling passes. Toward the center of the casting the crystaline structure usually changes again with more randomly-oriented dentritic crystals of rather large size.

In addition to the increase in the size and arrangement of the dendritic crystals in the ingot, the composition varies. In the chill zone, as above stated, the composition of the metal most nearly approaches the composition of the melt, whereas constituents that are rejected in the crystals that first form are increasingly concentrated toward the center. Accordingly, the last material to solidify contains the largest concentration of those elements which have been continuously rejected in the crystalization process. This tendency to segregate increases with increased time for solidification so that larger ingots exhibit more severe segregation than smaller ones. Also, in ingots cast in molds the chemical composition of the metal will seldom be uniform in cross-sectional areas examined at intervals along the whole length of the casting. Continuous casting eliminates for the most part this variation in chemical composition at different sections lengthwise of a casting, but difference in chemical composition and structure from the outside toward the center is not avoided, especially in larger sections.

To overcome the effect of such variation and develop the required mechanical properties the casting must be reduced in section by rolling or forging it. The original cast structure with large crystals has to be broken down by rolling or forging in a range, depending on the size of the ingot and the composition, of perhaps 1:5 to 1:30. Heat treatment to achieve equalization of composition by diffusion may also be necessary, or desirable.

These procedures in the conversion of molten metal into a reasonable tonnage per year of finished, or even semi-finished rolled products requires a high investment cost in casting plants, rolling mills, reheating furnaces as well as high labor costs, and with many operations, high fuel costs. While continuous casting has decreased costs to a considerable extent not only in reducing labor cost and increasing yield, but from the fact that cast sections of smaller cross-sectional area can be economically produced to thereby eliminate the rolling of large ingots down to billet sizes and lengths. The investment costs and labor costs are nevertheless high per ton of finished product.

The present invention has for its primary objects to improve the product and reduce costs by laminating and fusing or welding together metal comprising the rapidly-solidified metal of chill zone thickness to generate a semi-finished body for rolling or forging as contrasted to casting a semi-finished body of large cross-sectional dimensions and breaking it down by hot working to achieve good mechanical properties. In other words the molten metal is transformed into thin sections, the surface areas of which are fused or welded together into a compacted unitary body having good mechanical and chemical properties throughout.

As illustrative of the invention the molten metal may be congealed in contact with a cold surface into a thin sheet and combined with one or more similarly-formed strips or sheets at a temperature and pressure in a non-oxidizing atmosphere where they fuse together and are integrated into a single thicker strip or sheet which is slightly less in thickness than the sum of the thickness of the individual strips or sheets but having the mechanical soundness and chemical uniformity of thhe individual sheets. Such an integrated unit may then be rolled with relatively light mills and few passes into a finished product, such, for example, as sheet metal of any selected gauge. The work of casting a thick section, cooling it to a solid state and then breaking it down in heavy rolling mills and numerous passes to a final gauge is eliminated. Other methods of layering to build up to the required composite thickness may be resorted to, as by folding a sheet upon itself or coil-rolling it tightly either lengthwise or crosswise upon itself or bundling together several individually chill-cast flat-sided layers into some rod-like shape.

The invention may be more fully understood by reference to the accompanying more or less schematic drawings wherein:

FIG. 1 represents a longitudinal section through one form of apparatus for carrying out my invention;

FIG. 2 is a perspective view illustration showing another procedure, much of the apparatus being only schematically indicated;

FIGS. 3 to 6 are schematic representations in transverse section showing the development of the thickened section by folding a flat sheet upon itself, FIG. 3 showing the thin flat casting; FIGS. 4 and 5 showning progressive stages respectively in folding, and FIG. 6 indicates how the layers ultimately overlie each other just before the final fusing of them; and FIG. 7 is a perspective view indicating how a section from a continuously-formed thin casting may be cut to a predetermined length and coiled tightly upon itself to be fused into a semi-finished single body of circular section and fused or welded in peripherally-grooved rolls.

Referring first to FIG. 1 of the drawings, 2 is a refractory-lined vessel. There is a ladle 3 with a controlled outlet 4 for discharging molten metal into the vessel 2 in such manner as to maintain a uniform depth of metal in the vessel 2. There are a plurality of hollow water-cooled rolls 5 extending crosswise of the vessel 2, three such rolls being here shown. Each roll is so placed that its shaft and bearings, not shown, but indicated by circles 6 and 7 respectively, are above the level of the liquid metal 8 inside the vessel 2. The lower portion of the periphery of each roll 5 dips into and extends below the surface of the molten metal.

The rolls are driven at the same speed by any well-known means (not shown). Therre is a hood 9 over the vessel 2 by which non-oxidizing atmosphere either of an inert gas or a vacuum may be maintained over the vessel. As each roll revolves a layer of metal typically ranging upward to a thickness between 5mm. to about 10 mm. or 12 mm., or even more continuously forms on each roll surface so that the composition of this layer corresponds generally to the metal in the chill zone above described. The thickness of the layer so formed depends on the length of the arcuate surface of the roll that is submerged in the molten metal, the thickness of the rolls, the speed of revolution of the roll and the condition of the metal, (1) as to the degree of superheat, and (2) the kind and grade of the metal.

As the roll at the left rotates, the congealed layer 10 so formed is carried up out of the body of liquid metal in the vessel. A stripper 11 assures the removal of this layer from the top of the roll and provides support to the still fragile casting as it moves horizontally toward thetop of the center roll where it rides up on the similar layer 12 leaving the center roll, its cooler and firmer under surface overriding the hotter freshly-formed top surface of the layer 12 while a pressure roll 13 applies a light even pressure to cause fusion or welding of the two layers into a single thicker strand. This thicker strand moving over the intermediate stripper and support 14 then rides up over the congealed layer 15 at the top of the right or last roll in this view and again the cooler under surface of the now-combined first two layers contact the freshly-formed surface of the layer 15. Fusion again takes place under even pressure applied by pressure roll 16. The pressure rolls 13 and 16 may be power-driven or rotate entirely by contact with the top of the casting. The casting 17, now comprised of three separately formed layers brought together above or after leaving the body of molten metal from which they are derived, rides over stripper 18 and out through a guide 19 at the discharge end of the apparatus, the guide constituting an extension of the hood. The guide with the casting moving through serves to restrict the influx of air into the space under the hood or the escape of inert or non-oxidizing gas. There is a duct 20 on the hood through which air may be removed from the hood or inert gas is supplied. Each pressure roll 13 and 16 has pressure adjusting means schematically indicated at 13' and 16' respectively.

Each casting roll may have means indicated at 21 for applying a release coating across the face of the casting roll along which it extends on the descending surface of the roll. The fresh metal entering the vessel 2 rises through openings 22 in a false bottom 23 under the rolls where refractory baffles 24 serve to keep slag or surface impurities away from the place where the respective rolls enter the molten metal.

As the casting emerges from the guide 19 and at a distance sufficiently removed from the casting unit for the metal to have cooled to a normal rolling temperature, it may be and desirably is passed through a reducing roll stand 25. From this roll it may be cooled to a semi-finished product or rolled directly to a finished state.

While three rolls have been illustrated, there may be others, and in fact many narrow strands may be separately formed side by side on one or more rolls and fused together for producing rods or bars. Also rolls are specifically described since they form a simple illustration for an apparatus providing a continuously-moving chilled surface but, depending somewhat on the product, endless belts or a continuous succession of mold elements, like a tractor tread may be used. As indicated, however, the films or castings are separately formed and then brought together and consolidated above the level of the molten liquid in the vessel, or after they have otherwise moved out of contact with the body of molten metal from which they are formed. I have indicated that the chill zone may vary between 5 mm. and 12 mm. for different steels, but I may find it desirable to form layers or strands less than 5 mm. and consolidate them and to even exceed 12 mm. If I exceed the maximum of 12 mm. I may lose some of the advantage as far as quality of product is concerned, but since it is not practical to continuously cast strands below 100 mm. in thickness, I may nevertheless secure in improved product and eliminate the expense over starting with a much thicker casting, as for example a continuously-cast strand made by conventional casting, and rolling it down to a finished product. In other words building up a unitary strand from layers which may exceed a chill zone thickness may be more economical and yield a superior product than the conventional practice of initially casting a heavy section and working it down to a thin product.

FIG. 2 illustrates a proces for converting the liquid metal into a bar section. There is a single hollow water-cooled roll 30 arranged to rotate in a refractory-lined vessel 31 in which a constant depth of molten metal is contained. Such a supply source, not shown, may be similar, for example, to the bottom pour ladle 3 of FIG.

1. The lower part of the periphery of the roll is immersed in the molten metal. As in FIG. 1, this roll is driven in a conventional manner, the drive not being shown, and for purposes of illustration the enclosing hood to maintain a controlled inert atmosphere or vacuum over the molten metal has been omitted.

The surface of roll 30 is formed with a succession of ridges and grooves so that as the metal congeals on the roll a casting 32 is formed with a succession of confronting planar surfaces 33 connected with each other at the ridges and valleys of the casting. In other words in this view, instead of each layer being formed entirely separate from the others, as in FIG. 1, the casting comprises a multiple of partially separate layers connected as above stated at the ridges and valleys. The casting upon leaving the casting roll travels toward a compacting pass formed between vertical rolls 34 where the several planar surfaces 33 are crowded in toward and pressed against one another and fused together to form a bar section 35 which may be further reduced to a finished product, or which may provide a semi-finished section for subsequent conversion to a finished product. A stripper (not shown) but similar to the strippers shown in FIG. 1 may be provided to support the casting as it is stripped from the forming roll. Also, a mold release fluid may be applied to the roll in the same manner as in FIG. 1. In both of the two methods here disclosed the casting is formed continuously.

In FIGS. 3–6 there is indicated another procedure where, as in FIG. 2, connected folds or portions of a single casting are brought together. In this modification a flat casting is formed as in FIGS. 1 or 2 by forming it on a water-cooled roll or other cooled moving element and then stripping it from the roll. In FIG. 3 such a flat casting is shown at 40. As indicated in FIG. 4 the center 41 of the casting is kept flat while side margins 42 of the same width as the center are turned up at each side of the casting and one side folded in over the center and then, as shown in FIG. 6, the other one is folded in over the first and pressed evenly to effect fusion of tthe contacting surfaces. This procedure may be performed on continuous lengths or by serving the continuously-formed casting into predetermined lengths. When the consolidated casting 43 so formed has cooled to normal rolling temperature it may be rolled through a reducing mill as shown in FIG. 1.

In FIG. 7 a flat casting as shown in FIG. 6 is cut either crosswise or lengthwise to the desired dimension and then tightly coiled upon itself as indicated at 50 and the resulting round body is passed through grooved rolls 51 to apply sufficient pressure while the metal is still hot to fuse the convolutions to one another into a solid, or tubular section, which, upon cooling, may be further rolled or worked.

Empirical dimensions, temperatures and pressures cannot be established and one skilled in the art will be expected to establish the parameters for the procedure after reasonable experimentation. In some cases it may be necessary to even apply additional heat as the compacting, folding or coiling takes place to effect fusion of the separate castings or layers or folds or coiledover areas of the same casting. In all cases the composite product, for purposes of illustration, shows the lines where the contacting surfaces come together but in actual practice such a laminated appearance will not be apparent.

It may be pointed out, however, that as the metal congeals from the liquid to the solid state, some metal will develop plastic properties at a relatively few degrees below the solidus temperature while in others there may be a range of 100°C. or more, even perhaps 200°C. or more between the solidus and the development of good plastic qualities. The welding or fusion or consolidation of the layers of the castings may take place at or about the solidus stage, that is, where it manifests itself as a solid, even though indications are that, because of poor plasticity, some liquid metal may still exist between the dendrite boundaries. In other words, weld, or fusing or consolidation will usually be above a temperature where the metal has sufficient plasticity for normal rolling. As a general rule the pressure applied by the compacting rollers which first press the layers together should effect a reduction in the thickness of the composite of the two or more layers in a range of 0.2% to 2%. Low carbon steel of about 0.10%C. quickly develops good plastic properties below the solidus and may in many cases be subjected to pressure in compacting or consolidating the metal to a unitary body such as to produce 20% reduction in section, whereas steel high in impurities, e.g., S, P. Cu, Sn, etc. will have poor plasticity as much as 150° below solidus and cannot tolerate a reduction of more than 0.3%. Generally therefore the pressure to effect fusion should be such that the reduction in thickness should never be more than needed to effect good bonding, that is something of the order of ∓2% based on the tolerance of the metal. If pressure exceeds such critical limits the compacted product will have various weakness or internal defects. After normal rolling temperature is reached the consolidated casting may then be reduced as much as 20% or more in thickness in a single roll pass.

It is not difficult to understand for example that if three layers of chill zone thickness of perhaps 10 mm. each are combined into a single body of 30 mm. and reduced 20% to a semifinished product, much less work is required to convert it say to 10 or 20 gauge sheet metal than to roll a cast slab of several inches in thickness down to the same gauge and the extensive hot working is not required with this process because the metal is entirely, or largely metal of chill-zone thickness and crystal structure above as above explained and of the chill-zone composition.

I claim:

1. A metallurgical process for the production of a semi-finished product for subsequent rolling or forging into a finished product, wherein
   a. a melt of molten steel is simultaneously and continuously formed on moving chill surfaces into a plurality of layers of substantially uniformly fine grain structure throughout the thickness of each layer and stripping the layers from the chill surfaces as they are formed,
   b. bringing such layers together in face-to-face contact when they are at the solidus temperature where the metal in the layers shows no apparent liquid at the surface but before it has developed sufficient plasticity for hot rolling,
   c. pressing the contacting layers together with a pressure only sufficient to reduce the thickness of the combined layers not more than 2% of the combined thickness, and
   d. effecting the forming of the layers, the bringing them together and pressing them being effected in a common enclosure in which the hot metal is constantly protected by an inert atmosphere and removing the composite body so formed from said atmosphere only when it has cooled to at least a normal hot rolling temperature.

2. The process defined in claim 1 in which there are a plurality of layers in excess of two which are simultaneously formed and brought together.

3. The process defined in claim 2 in which the number and widths of the layers, when initially pressed together, form a body of square section.

4. The method of converting molten metal into a semi-finished product as defined in claim 1 in which the continuously formed layers of metal are separately formed on separate constantly-moving chilled surfaces and the said layers are of a thickness of from 5 mm. to 12 mm.

5. The method of converting molten metal into semi-finished products as defined in claim 1 in which the constantly-moving chilled surfaces are provided by the peripheries of separate rolls having their lower portions dipping into a common bath of molten metal and having their upper surfaces clear of the bath of molten metal with the layers being stripped tangentially in a horizontal direction from the surfaces of the rolls whereby the effect of gravity on the solidifying metal is minimized.

6. The method defined in claim 1 in which there are at least three separately formed layers of metal formed on spaced rotating rolls immersed in the same vessel of molten metal and sequentially united into a unitary body with the thickness of each layer ranging between 5 mm. and 12 mm. and the total reduction in thickness resulting from the fuse-welding of the several layers is in the range of 0.2% of the combined thickness of the layers to 2%.

7. The method defined in claim 1 which comprises forming a single continuous casting comprised of several layers in side-by-side relation, folding portions of said single casting into a composite body having a plurality of layers and fuse-welding the several layers into a single continuous casting.

8. The metallurgical process in which several layers of metal are continuously formed from solidification of several layers of metal on a chilled surface having a ridge and valley contour where the layers formed thereon are joined along their side edges alternately at the peaks and valleys, the layers so formed being stripped from the surface on which they are formed and, as they solidify to the solidus state but are still above a plastic hot rolling state, being then pressed into flat face-to-face contact with a pressure sufficient to effect welding of the layers into an integral body but to an extent where the metal, still too hot to have the required plastic structure for hot rolling undergoes a reduction in the range of 0.2% to 2% of the combined thickness of the layers.

* * * * *